United States Patent [19]

Hanson

[11] 4,116,941
[45] Sep. 26, 1978

[54] WATER-SOLUBLE POLYESTER-IMIDES

[75] Inventor: Robert B. Hanson, Aurora, Ill.

[73] Assignee: Standard Oil Company, a corporation of Indiana, Chicago, Ill.

[21] Appl. No.: 691,771

[22] Filed: Jun. 1, 1976

[51] Int. Cl.$^2$ ............................................. C08G 63/12
[52] U.S. Cl. .................. 260/29.2 N; 174/110 SR; 260/29.2 E; 260/29.2 N; 428/379; 428/383; 528/273; 528/288; 528/289
[58] Field of Search .......... 260/75 N, 29.2 E, 29.2 N; 428/379, 383

[56] References Cited

U.S. PATENT DOCUMENTS

| | | | |
|---|---|---|---|
| 3,426,098 | 2/1969 | Meyer et al. | 260/75 N |
| 3,493,413 | 3/1970 | Olson et al. | 428/383 |
| 3,562,219 | 2/1971 | Schmidt et al. | 260/75 N |
| 3,697,471 | 10/1972 | Schmidt et al. | 260/75 N |
| 3,709,846 | 1/1973 | Tsou | 260/29.2 TN |
| 3,922,252 | 11/1975 | Holub | 260/75 N |
| 3,931,418 | 1/1976 | Risken | 260/75 R |
| 4,011,185 | 3/1977 | Hosokawa et al. | 260/29.2 N |
| 4,038,254 | 7/1977 | Schade et al. | 260/75 N |
| 4,046,835 | 9/1977 | Gruffaz et al. | 260/75 N |
| 4,066,593 | 1/1978 | Czajka et al. | 260/29.2 E |
| 4,066,622 | 1/1978 | Feinstein | 260/75 N |
| 4,070,524 | 1/1978 | Keske | 428/383 |

FOREIGN PATENT DOCUMENTS

| | | | |
|---|---|---|---|
| 2,528,251 | 1/1977 | Fed. Rep. of Germany | 250/75 N |
| 1,184,139 | 3/1970 | United Kingdom | 260/75 N |

OTHER PUBLICATIONS

Chem. Absts. vol. 80: 4269u, Polyesterimide Resins, Nishioka et al.
Chem. Abstrs. vol. 83: 62031h, Aqueous Insulation Lacquer, Ishizuka.

Primary Examiner—Edward M. Woodberry
Attorney, Agent, or Firm—Stanley M. Welsh; Arthur G. Gilkes; William T. McClain

[57] ABSTRACT

Water-soluble polyesterimide resin compositions are prepared by in situ reaction of a mixture of glycol and triol with organic diacid and trimellitic anhydride/aromatic primary diamine. The product is reacted with additional trimellitic anhydride for use as wire enamel in water-base solution and chelated ethanolamine titanate is added to the solution as a crosslinking agent.

11 Claims, No Drawings

WATER-SOLUBLE POLYESTER-IMIDES

BACKGROUND OF THE INVENTION

This invention relates to polyesterimide resin compositions which are soluble in water-based solvents. These compositions are used as coatings, particularly as wire enamel.

Wire enamels designed for severe service in continuous operation at temperatures above 220° C. have been aromatic polyimide and polyamide-imide compositions. These compositions require nitrogen or sulfoxide-containing organic polar solvents which are expensive and present problems in disposal. The polymeric amide-imide-ester wire enamels described in Sattler, U.S. Pat. No. 3,555,113 (1971) are an attempt to accept moderate compromise in thermal properties in order to reduce the cost of the required solvent. But even these compositions require aromatic solvents such as cresol, cresylic acid, phenol, and hydrocarbon diluents which still represent considerable expense and disposal in a commercial operation.

Weddleton, U.S. Pat. No. 3,853,817 (1974) teaches preparation of thermosetting polyesterimide resins suitable for electrostatic spraying deposition upon electrical conductors, but the imide portion of these resins is once again formed by reaction in the expensive nitrogen and sulfoxide solvents.

SUMMARY

Water-soluble polyesterimide resin compositions are prepared by in situ reaction of a mixture of glycol and triol with organic diacid and trimellitic anhydride/aromatic primary diamine. The product is reacted with additional trimellitic anhydride for use as wire enamel in water-base solution and chelated ethanolamine titanate is added to the solution as a crosslinking agent.

DETAILED DESCRIPTION OF THE INVENTION

Two basic condensation schemes can be used to produce the water-soluble polyesterimide resins of this invention. In the first reaction scheme, polyester is formed by reaction of a mixture of glycol and triol with organic diacid which is followed by in situ addition of the imide-forming reactants, trimellitic anhydride and an aromatic primary diamine in the ratio of about 2:1. To ensure stable solubility in water-base solvent systems, the product is subsequently reacted with additional trimellitic anhydride (TMA).

In the second reaction scheme, a more random polymer is made by making the imide and polyester segments at the same time by reaction of (1) a mixture of glycol and triol, (2) a mixture of organic diacid and trimellitic anhydride, and (3) aromatic diamine. The ratio of TMA to diamine is again about 2:1 and the equivalent ratio to the mixture of glycol and triol to diamine is about 1.7:1 to about 8:1. As in the first scheme, stable water solubility is ensured by reacting the product with additional trimellitic anhydride.

Catalysts May or May Not be Used to Prepare Polymer by Promotion of the Reaction Between Acid and Hydroxyl Groups.

Stannous oxalate has been found to be the most effective catalyst. Commonly used titanates (tetrabutyl and isopropyl) appear to produce precipitates.

The polymers are designed to contain excess hydroxyl groups which aid processing of the product and contribute to solubility in the water-based solvent systems. Generally, the hydroxyl functionality is provided by a mixture of glycol and triol. In the two-step reaction scheme, the hydroxyl functionality has an equivalent excess over the organic diacid in a ratio of about 1.5:1 to about 3.5:1. Generally most glycols and polyols are useful, although ethylene glycol will inhibit water solubility if used in large proportion. The preferred glycols are neopentyl glycol, propylene glycol, isobutyl glycol and bisphenol A. The most useful triols are trishydroxyethylisocyanurate (THEIC), trimethylolpropane and glycerol, with glycerol being the preferred. The most useful organic diacids are terephthalic acid and isophthalic acid, terephthalic acid being the preferred. A most surprising discovery is that some aliphatic diacids provide the polymer with improved thermal properties over terephthalic acid in wire enamel applications. Azelaic acid provides particularly improved burnout value and dielectric strength in comparison to terephthalic acid. Conventionally used aromatic primary diamines are suitable, with methylenebis (aniline) preferred.

Subsequent reaction of product with additional TMA, referred to as "TMA capping" is primarily responsible for stable solubility in the water-based solvent systems. TMA capping will provide acid end groups by opening the anhydride moiety if the final mixture is heated for approximately 1 hour at 200°–205° C. to an acid number of approximately 60. However, there will usually be approximately 10% theoretical equivalent excess hydroxyl in the final polymer when designed for coating applications.

The water-based solvent system is generally composed of 70 to 90 weight percent water, 5 to 15 weight percent diethylene glycol and 1 to 10 percent dimethylethanolamine. The preferred water/co-solvent composition is 80 weight percent water, 13 weight percent diethylene glycol, and 7 weight percent dimethylethanolamine. Other glycols may be substituted for diethylene glycol, among them propylene glycol. Wire coatability improves with decrease in dimethylethanolamine to about 4 weight percent solvent composition.

The polyesterimide resins are employed as wire enamels while in solution in solvent systems specified above. Conventional "free dip" or "dye application" procedures are described in Meyer, U.S. Pat. No. 3,201,276. In wire enamel and other coating applications, a crosslinking agent such as a chelated ethanolamine titanate is added to the solutions at a level of from 1 to 10 percent, based on solids, with 5 percent being the preferred level. This titanate is available commercially from Du Pont with the trade name TYZOR TE. Fresh solutions of the polymer generally have a pH of 8-9. Slight haze from a partially precipitated sample can be prevented if the solution is allowed to age to a pH of approximately 7 before adding the TYZOR TE agent to the solution.

PREFERRED EMBODIMENTS

The following examples do not indicate any limitation upon the scope of the claims.

EXAMPLE I

A two-step synthesis was carried out as follows:
Neopentyl glycol (174.7 g, 1.68 moles), propylene glycol (22.6 g, 0.30 moles) trishydroxyethylisocyanurate (46.0 g, 0.18 moles), terephthalic acid (159.4 g, 0.96 moles), and isophthalic acid (19.2 g, 0.12 moles) were before the wire coating evaluation with properties as follows:

| SAMPLE | SPEED (FPM) | CURE TEMP. | BTTM TEMP | BUILD (MILS) | 20% (SPM) | 40% (SPM) | BURN OUT | DIELEC (KVPM) | SCRAPE (KG) | HEAT SHOCK |
|---|---|---|---|---|---|---|---|---|---|---|
| A | 30 | 800 | 400 | 2.9 | IX | IX | 571 | 8.0 | 0.78 | 100% at 220° C |
|   |    |     |     |     |    |    | 549 | 9.1 | 0.72 |  |
|   |    |     |     |     |    |    | 599 | 10.0 | 0.80 |  |
|   |    |     |     |     |    | AVG. | 573 | 3.1 | 0.77 |  |
| B | 40 | 800 | 400 | 3.0 | IX | IX | 510 | 10.0 | 0.72 | 100% at 220° C |
|   |    |     |     |     |    |    | 558 | 8.3 | 0.71 |  |
|   |    |     |     |     |    |    | 578 | 7.0 | 0.73 |  |
|   |    |     |     |     |    | AVG. | 549 | 2.8 | 0.72 |  |

*All TEMPERATURES IN DEGREES F UNLESS NOTED.

charged to a 1000 ml resin kettle equipped with a nitrogen inlet tube, electric (paddle) stirrer, thermometer, trap and condenser. Heat is applied and the flask contents raised to 205°–235° C. The mixture is initially held at 205° C. for 6 hours, 6 hours at 215°–220° C., and a final 6 hrs. at 230°–235° C. The polyester resin at this point has an acid No. of 3–5. The contents of the flask are cooled to 120° C. and 63.5 g (0.32 mole) of methylenebis (aniline) and then 123.0 g (0.64 mole) of trimellitic anhydride are added. The temperature is slowly raised (2 hrs.) to 225° C. and held for 5 hrs. At 160° C. 80 g (0.42 mole) of trimellitic anhydride is added and the mixture is heated at 204° C. for 1 hr. The contents of the flask are then poured hot into an aluminum trough and allowed to cool. A solution of the product was prepared by heating 300 g of polymer with 90 g diethylene glycol at 160°–170° C. The viscous solution was cooled to 140° C. and 50 g dimethylethanol amine was added dropwise over 20 min. Water, 560 g, then added over 30 min. at 80°–95° C. The resultant viscous solution (10 poise) was filtered when cool.

EXAMPLE II

A one-step synthesis was carried out as follows:

Into the apparatus described in Example I were charged neopentyl glycol (354.3 g, 6.80 equivalent units), propylene glycol (45.2 g, 1.20 equivalents), glycerol (36.8 g, 1.20 equivalents), terephthalic acid (348.9 g, 4.20 equivalents), trimellitic anhydride (230.6 g, 2.40 equivalents), and methylenebis (anilene) (119.0 g, 1.20 equivalents). The initial components were heated neat and held at 200°–205° C. for 4 hrs., then held at 220° C. for 4 hrs., and then held at 230° C. for 8 hrs. to an acid number of about 8.9. The contents were cooled to 180° C. and 146 g of trimellitic anhydride added, then heated at 204° C. for 1 hr. and 15 minutes to an acid number of about 53.6. A solution was then prepared as in Example I, having a viscosity of about 9.0 poise.

EXAMPLE III

A resin was prepared as in Example II by replacement of all terephthalic acid with azelaic acid, and TYZOR TE (5% on solids) was added to the solution

I claim:
1. A water-soluble polyesterimide resin comprising the reaction product of
   1. a mixture of glycol and triol,
   2. a mixture of organic diacid and trimellitic anhydride, and
   3. aromatic primary diamine wherein the ratio of trimellitic anhydride to (3) is about 2:1 and wherein the equivalent ratio of (1) to (3) is about 1.7:1 to about 8:1 which is subsequently reacted with additional trimellitic anhydride.

2. A water-soluble polyesterimide resin comprising the reaction product of
   1. a mixture of glycol and triol and
   2. organic diacid, wherein (1) is in equivalent excess of (2) by a ratio of about 1.5:1 to about 3.5:1, which is further reacted in situ with
   3. trimellitic anhydride and
   4. aromatic primary diamine wherein the ratio of (3) to (4) is about 2:1 and the equivalent ratio of (1) to (4) is about 8:1 to about 1.7:1 which is subsequently reacted with additional trimellitic anhydride.

3. The product of claim 1 wherein the aromatic primary diamine is methylenebis (aniline).

4. A solution of the polyesterimide resin of claim 1 in a water-based solvent.

5. The solution of claim 4 wherein the solvent comprises 70 to 90 weight percent water, 5 to 15 percent diethylene glycol and 1 to 10 percent dimethylethanolamine.

6. The solution of claim 4 containing a minor proportion of a titanate.

7. The solution of claim 4 wherein the titanate is a chelated ethanolamine titanate.

8. The heat cured product from the solution of claim 7.

9. An electrical conductor coated with the heat cured product of claim 8.

10. The water-soluble polyesterimide resin of claim 1, wherein said organic diacid comprises azelaic acid.

11. The water-soluble polyesterimide resin of claim 2, wherein said organic diacid comprises azelaic acid.

* * * * *